(12) United States Patent
Sutardja

(10) Patent No.: US 7,480,121 B1
(45) Date of Patent: *Jan. 20, 2009

(54) ELECTROSTATIC DISCHARGE PROTECTION CIRCUIT FOR PREAMPS CONNECTED TO MAGNETO-RESISTIVE READ ELEMENTS

(75) Inventor: Pantas Sutardja, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 11/975,975

(22) Filed: Oct. 23, 2007

Related U.S. Application Data

(63) Continuation of application No. 10/788,844, filed on Feb. 27, 2004, now Pat. No. 7,286,328.

(60) Provisional application No. 60/513,690, filed on Oct. 23, 2003.

(51) Int. Cl.
*G11B 5/39* (2006.01)

(52) U.S. Cl. ...................................... 360/323

(58) Field of Classification Search ................. 360/323, 360/322, 313, 110, 245.8, 234.5, 234.4
See application file for complete search history.

(56) References Cited

U.S. PATENT DOCUMENTS

| | | | |
|---|---|---|---|
| 5,587,857 A | 12/1996 | Voldman et al. | 360/234.4 |
| 5,761,009 A | 6/1998 | Hughbanks et al. | 360/323 |
| 5,777,829 A | 7/1998 | Voldman et al. | 360/128 |
| 6,005,733 A | 12/1999 | Schuelke et al. | 360/67 |
| 6,067,220 A | 5/2000 | Ahmann et al. | 361/111 |
| 6,104,048 A | 8/2000 | Wang et al. | 257/272 |
| 6,128,149 A | 10/2000 | Li | 360/66 |
| 6,157,530 A | 12/2000 | Pequignot et al. | 361/111 |
| 6,218,903 B1 | 4/2001 | Hashimoto et al. | 360/323 |
| 6,233,127 B1 * | 5/2001 | Shimazawa | 360/323 |
| 6,400,534 B1 | 6/2002 | Klaassen | 360/323 |
| 6,429,991 B1 | 8/2002 | Tucker et al. | 360/66 |
| 6,507,471 B2 | 1/2003 | Colclaser et al. | 361/111 |
| 6,538,857 B1 | 3/2003 | Doss et al. | 360/323 |
| 6,552,879 B2 | 4/2003 | Voldman | 360/323 |
| 6,574,078 B1 | 6/2003 | Voldman | 360/323 |
| 6,710,893 B1 | 3/2004 | Hou et al. | 358/1.15 |
| 6,891,702 B1 | 5/2005 | Tang | 360/323 |
| 7,009,820 B1 | 3/2006 | Hogg | 360/323 |
| 7,046,488 B1 | 5/2006 | Hogg | 360/323 |
| 7,119,995 B2 * | 10/2006 | Granstrom et al. | 360/323 |
| 7,142,398 B2 | 11/2006 | Granstrom et al. | 360/323 |
| 7,167,331 B1 | 1/2007 | Sutardja | 360/67 |
| 7,286,328 B1 | 10/2007 | Sutardja | 360/323 |
| 2002/0097532 A1 | 7/2002 | Voldman | 360/323 |
| 2003/0169540 A1 | 9/2003 | Granstrom et al. | 360/323 |
| 2003/0210501 A1 | 11/2003 | Voldman | 360/323 |
| 2005/0254158 A1 | 11/2005 | Kuehne et al. | 360/67 |

FOREIGN PATENT DOCUMENTS

JP 01196706 A 8/1989

* cited by examiner

*Primary Examiner*—Julie Anne Watko

(57) ABSTRACT

A magnetic storage system comprises a read element and an electrostatic discharge (ESD) protection circuit that communicates with the read element and that includes a normally-on transistor that shorts the read element when the magnetic storage system is unpowered.

12 Claims, 5 Drawing Sheets

US 7,480,121 B1

ELECTROSTATIC DISCHARGE PROTECTION CIRCUIT FOR PREAMPS CONNECTED TO MAGNETO-RESISTIVE READ ELEMENTS

CROSS-REFERENCE TO RELATED APPLICATIONS

This application is a continuation of U.S. Ser. No. 10/788,844, filed Feb. 27, 2004, U.S. Pat. No. 7,286,328, issued Oct. 23, 2007, which application claims the benefit of U.S. Provisional Application No. 60/513,690, filed on Oct. 23, 2003, all of which are hereby incorporated by reference in their entirety.

FIELD OF THE INVENTION

The present invention relates to magnetic storage systems, and more particularly to magnetic storage systems that include magneto-resistive read elements.

BACKGROUND OF THE INVENTION

Referring to FIG. 1, an exemplary magnetic storage system 2 such as a hard disk drive is shown. A buffer 3 stores data that is associated with the control of the hard disk drive. The buffer 3 may employ SDRAM or other types of low latency memory. A processor 4 performs processing that is related to the operation of the hard disk drive. A hard disk controller (HDC) 6 communicates with the buffer 3, the processor 4, a host 7, a spindle/voice coil motor (VCM) driver 8, and/or a read/write channel circuit 10.

During a write operation, the read/write channel circuit (or read channel circuit) 10 encodes the data to be written onto the storage medium. The read/write channel circuit 10 processes the signal for reliability and may include, for example error correction coding (ECC), run length limited coding (RLL), and the like. During read operations, the read/write channel circuit 10 converts an analog output from the medium to a digital signal. The converted signal is then detected and decoded by known techniques to recover the data written on the hard disk drive.

One or more hard drive platters 11 include a magnetic coating that stores magnetic fields. The platters 11 are rotated by a spindle motor that is schematically shown at 12. Generally the spindle motor 12 rotates the hard drive platter 11 at a fixed speed during the read/write operations. One or more read/write arms 14 move relative to the platters 11 to read and/or write data to/from the hard drive platters 11. The spindle/VCM driver 8 controls the spindle motor 12, which rotates the platter 11. The spindle/VCM driver 8 also generates control signals that position the read/write arm 14, for example using a voice coil actuator, a stepper motor or any other suitable actuator.

A read/write device 15 is located near a distal end of the read/write arm 14. The read/write device 15 includes a write element such as an inductor that generates a magnetic field. The read/write device 15 also includes a read element (such as a magneto-resistive (MR) sensor) that senses the magnetic fields on the platter 11. A preamplifier (preamp) circuit 16 amplifies analog read/write signals. When reading data, the preamp circuit 16 amplifies low level signals from the read element and outputs the amplified signal to the read/write channel circuit 10. While writing data, a write current that flows through the write element of the read/write channel circuit 10 is switched to produce a magnetic field having a positive or negative polarity. The positive or negative polarity is stored by the hard drive platter 11 and is used to represent data.

Referring now to FIG. 2, the read channel circuit 10 outputs write signals $w_{dx}$ and $w_{dy}$ to the preamp circuit 16 when writing data. The preamp circuit 16 amplifies the write signals using a write amplifier 18. The amplified write signals are output to the read/write device 15. When reading data, the preamp circuit 16 receives signals from the read/write device 15, amplifies the signals using a read amplifier 19, and outputs amplified read signals $r_{dx}$ and $r_{dy}$ to the read channel circuit 10.

Some magnetic storage systems employ giant magneto-resistive (GMR) sensors as the read element. GMR sensors are more sensitive to magnetic transitions than MR sensors. For example, the GMR sensors are typically twice as sensitive as MR sensors. GMR sensors and other read elements are highly sensitive to electrostatic discharge (ESD). For example, the GMR sensor may have an ESD voltage tolerance of approximately 1V. GMR sensors are typically biased at 0.5V or lower during normal operating conditions. The risk of damage to a read element from ESD is greatest during manufacturing when the circuit is handled. Static discharge may occur when the circuit is handled which may damage the read element.

GMR sensors are typically protected from ESD damage by diode shunting circuits, which limit the maximum voltage that is applied to the GMR sensor. The maximum voltage is limited to a forward biased turn-on voltage of a single diode. Silicon junction diodes typically have a forward-biased turn on voltage between 0.7V and 0.8V. Schottky diodes typically have a forward-biased turn-on voltage between 0.4V and 0.5V.

Referring now to FIG. 3, the preamp circuit 16 includes an ESD protection circuit 30 that limits a maximum voltage that is applied to a read element 32 in the read/write device 15. The ESD protection circuit 30 includes first, second, third, and fourth diodes 34, 36, 38 and 40, respectively. An anode of the first diode 34 and a cathode of the second diode 36 communicate with a first terminal of the read element 32. An anode of the third diode 38 and a cathode of the fourth diode 40 communicate with a second terminal of the read element 32. A cathode of the first diode 34 communicates with an anode of the second diode 36. A cathode of the third diode 38 communicates with an anode of the fourth diode 40.

The first terminal of the read element 32, the anode of the first diode 34, and the cathode of the second diode 36 communicate with a first current source 42. The second terminal of the read element 32, the anode of the third diode 38, and the cathode of the fourth diode 40 communicate with a second current source 44. The first and second current sources 42 and 44, respectively, communicate with a supply potential 46. The cathode of the first diode 34, the anode of the second diode 36, the cathode of the third diode 38, and the anode of the fourth diode 40 communicate with a ground potential 48.

The ESD protection circuit 30 optionally includes fifth and sixth diodes 50 and 52, respectively. An anode of the fifth diode 50 and a cathode of the sixth diode 52 communicate with the first terminal of the read element 32 and the first current source 42. A cathode of the fifth diode 50 and an anode of the sixth diode 52 communicate with a second terminal of the read element 32 and the second current source 44.

The current sources 42 and 44, respectively, bias the read element 32 during normal operation. The diodes 34, 36, 38, 40, 50, and 52 form parallel back-to-back forward-biased diode shunting circuits. The diode shunting circuits limit a maximum voltage that is applied to the read element 32 to a forward biased turn-on voltage of one of the diodes 34, 36, 38, 40, 50, or 52. The maximum voltage of the shunting circuits is typically 0.7V for silicon junction diodes and 0.4-0.5V for Schottky diodes. GMR sensors begin to experience stress at 0.6-0.7V. Therefore, the range of protection offered by the diode turn-on voltage of conventional shunting devices is usually sufficient for GMR sensors.

However, tunneling giant magneto-resistive (TGMR) sensors are increasingly being used as read elements in magnetic storage systems. TGMR sensors have a very thin tunneling junction and begin to experience stress at approximately 0.3V. Therefore, the forward-biased turn-on voltage of either silicon junction diodes or Schottky diodes is not low enough to protect the TGMR sensor from ESD damage. Additionally, there are no conventional diodes that have a forward-biased turn-on voltage that is less than or equal to 0.3V.

SUMMARY OF THE INVENTION

A magnetic storage system according to the present invention comprises a read element and an electrostatic discharge (ESD) protection circuit that comprises a shunting device including a first terminal that communicates with a first terminal of the read element and a second terminal that communicates with a second terminal of the read element. The shunting device is conductive when the read element is disabled and nonconductive when the read element is enabled.

In other features, the ESD protection circuit includes a first voltage limiting circuit that limits voltage that is input to first terminals of the shunting device and the read element. The ESD protection circuit includes a second voltage limiting circuit that limits voltage that is input to second terminals of the shunting device and the read element.

In other features, the first voltage limiting circuit includes first and second diodes. An anode of the first diode and a cathode of the second diode communicate with the first terminal of the read element and the first terminal of the shunting device. A cathode of the first diode and an anode of the second diode communicate. The second voltage limiting circuit includes third and fourth diodes. A cathode of the third diode and an anode of the fourth diode communicate with the second terminal of the read element and the second terminal of the shunting device. An anode of the third diode and a cathode of the fourth diode communicate.

In still other features, the magnetic storage system includes first and second current sources. The first terminal of the read element and the first terminal of the shunting device communicate with the first current source. The second terminal of the read element and the second terminal of the shunting device communicate with the second current source.

In yet other features, a third voltage limiting circuit limits a voltage drop across the first and second terminals of the shunting device and the read element. The third voltage limiting circuit includes fifth and sixth diodes. A cathode of the fifth diode and an anode of the sixth diode communicate with the first terminal of the read element and the first terminal of the shunting device. An anode of the fifth diode and a cathode of the sixth diode communicate with the second terminal of the read element and the second terminal of the shunting device.

In still other features, the shunting device includes a transistor. The transistor includes a depletion mode metal-oxide semiconductor field-effect transistor (MOSFET). The read element includes a tunneling giant magneto-resistive (TGMR) sensor.

In other features, a voltage tolerance of the read element is less than 0.4 volts.

An electrostatic discharge (ESD) protection circuit according to the present invention for a read element in a magnetic storage system comprises a shunting device that includes first and second terminals that are connected to the read element. The shunting device provides a conductive path between the first and second terminals when the read element is disabled and a nonconductive path between the first and second terminals when the read element is enabled.

In other features, a first voltage limiting circuit limits a maximum voltage that is applied to the first terminal of the shunting device. In other features, the first voltage limiting circuit includes first and second diodes. An anode of the first diode and a cathode of the second diode communicate with a first terminal of the shunting device. A cathode of the first diode and an anode of the second diode communicate. A second voltage limiting circuit limits a voltage that is applied to a second terminal of the shunting device. The second voltage limiting circuit includes third and fourth diodes. A cathode of the third diode and an anode of the fourth diode communicate with a second terminal of the shunting device. An anode of the third diode and a cathode of the fourth diode communicate.

A magnetic storage system comprises the ESD protection circuit and further comprises first and second current sources. The first terminal of the shunting device communicates with the first current source. The second terminal of the shunting device communicates with the second current source.

A third voltage limiting circuit limits a voltage drop across the first and second terminals of the shunting device. The third voltage limiting circuit includes fifth and sixth diodes. A cathode of the fifth diode and an anode of the sixth diode communicate with the first terminal of the shunting device. An anode of the fifth diode and a cathode of the sixth diode communicate with the second terminal of the shunting device.

In other features, the shunting device includes a transistor. The transistor includes a depletion mode metal-oxide semiconductor field-effect transistor (MOSFET).

A magnetic storage system comprises the ESD protection circuit and further comprises the read element. The read element includes a tunneling giant magneto-resistive (TGMR) sensor.

In other features, a voltage tolerance of the read element is less than 0.4 volts.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
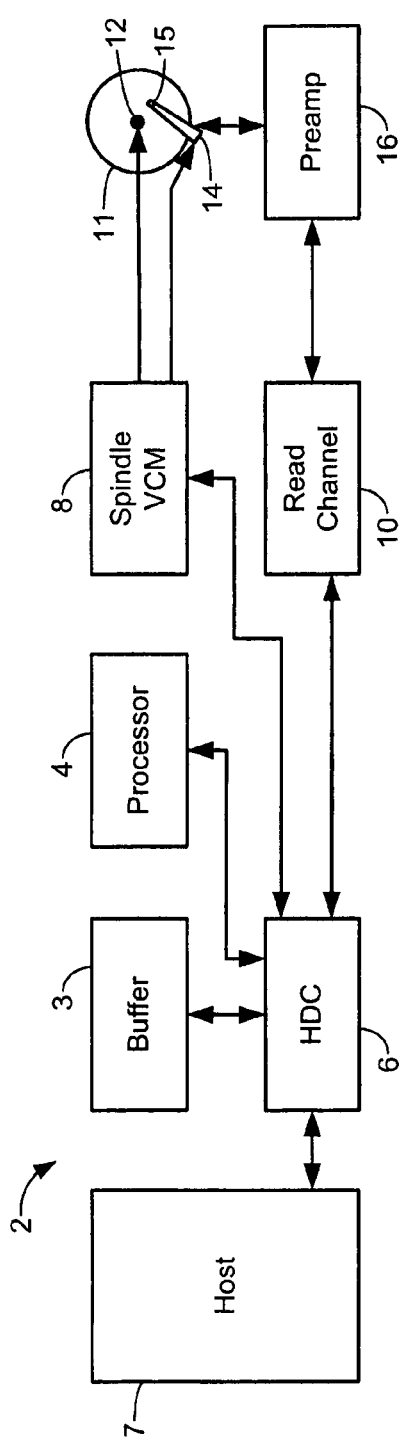
FIG. 1 is a functional block diagram of an exemplary data storage device according to the prior art.
Figure 2:
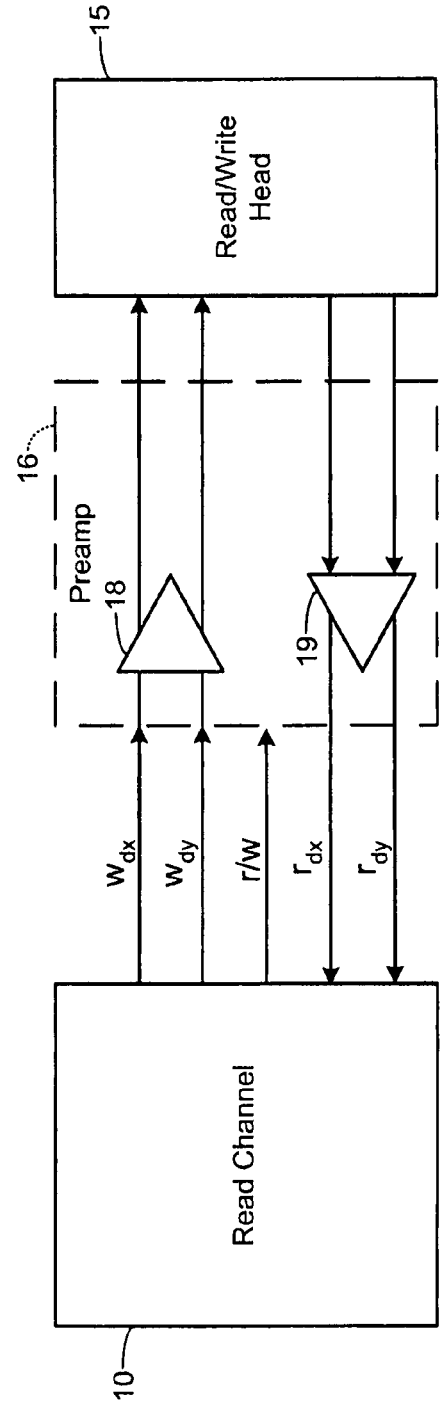
FIG. 2 is a functional block diagram of a read channel circuit and preamp circuit according to the prior art.

The following description of the preferred embodiment(s) is merely exemplary in nature and is in no way intended to limit the invention, its application, or uses. For purposes of clarity, the same reference numbers will be used in the drawings to identify similar elements.

During manufacturing, one or more components in the magnetic storage system may be handled. The risk of damage to a tunneling giant magneto-resistive (TGMR) sensor or other read element from electrostatic discharge (ESD) is particularly high during this time. However, once the magnetic storage system is fully assembled and sealed, the risk of damage from ESD is reduced. Therefore, the risk of damage to the read element from ESD is greatest when the read element is disabled.

Figure 4:
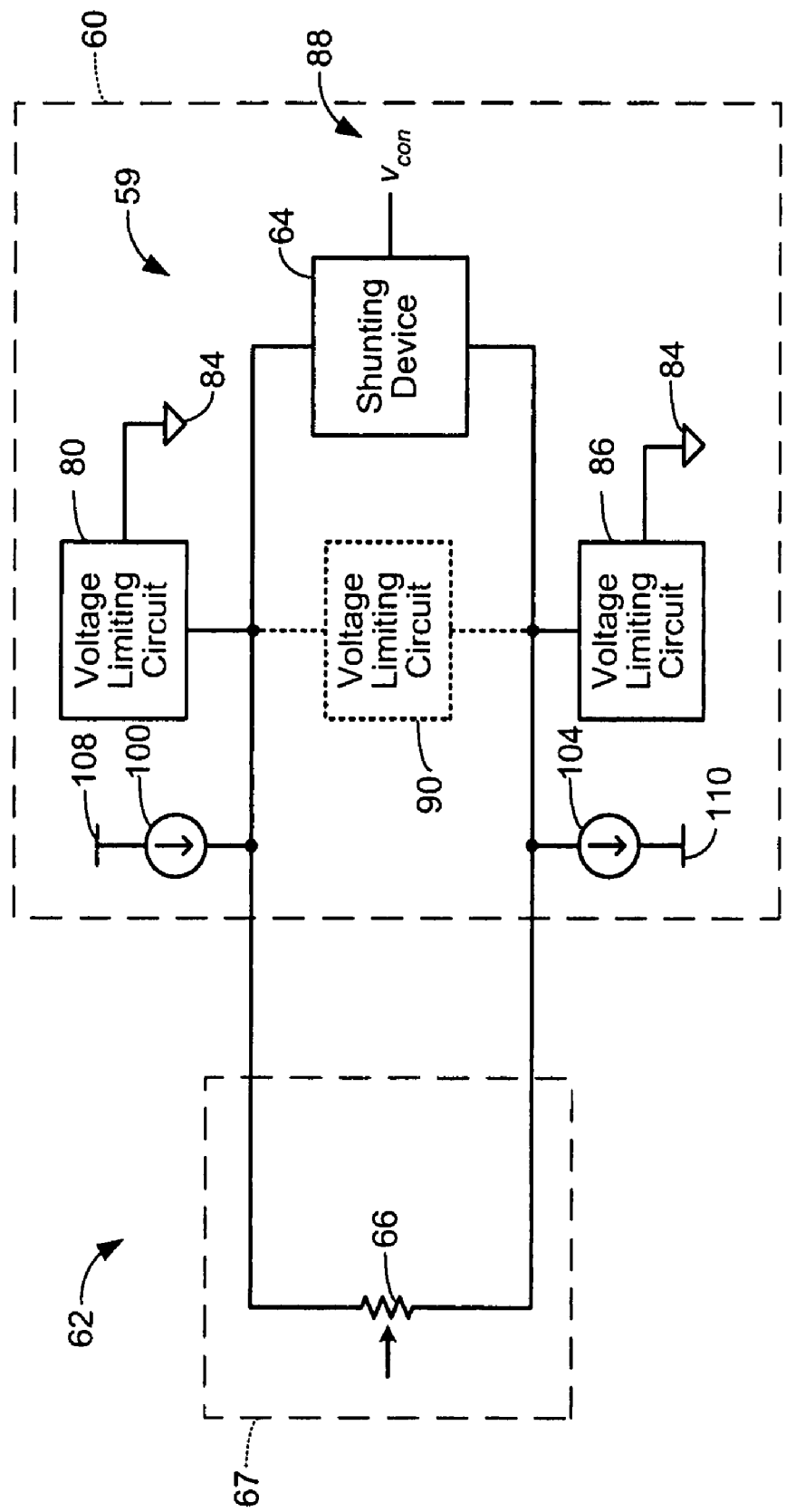
FIG. 4 is an electrical schematic of a first ESD protection circuit that includes a shunting device for a read element according to the present invention.

Referring now to FIG. 4, an ESD protection circuit 59 in a preamp circuit 60 of a magnetic storage system 62 is shown. The ESD protection circuit includes a shunting device 64 that protects a read element 66 from ESD damage when the read element 66 is disabled. A first terminal of the shunting device 64 communicates with a first terminal of the read element 66. A second terminal of the shunting device 64 communicates with a second terminal of the read element 66. For example in one implementation, the read element 66 may include a TGMR sensor, although other types of read elements may be used. For example, conventional read elements such as MR and GMR sensors can also be used. In addition, future MR and non-MR read elements having a sensitivity less than 0.4V can also be used.

The ESD protection circuit 59 further includes a first voltage limiting circuit 80 that is connected between first terminals of the read element 66 and the shunting device 64 and a reference potential 84 such as ground. A second voltage limiting circuit 86 is connected between second terminals of the read element 66 and the shunting device 64 and the reference potential 84. An optional third voltage limiting circuit 90 has first and second terminals that are connected to the first terminal and second terminals, respectively, of the read element 66 and the shunting device 64. The voltage limiting circuits 80, 86 and 90 limit the positive and/or negative voltage drops by shorting the first and second terminals of the voltage limiting circuits 80, 86 and 90 when the voltage across the first and second terminals exceeds first, second and third predetermined voltage levels, respectively. In one implementation, the predetermined voltage levels are less than 0.4V.

The preamp circuit 60 further includes a first current source 100 that is connected to the first terminals of the shunting device 64 and the read element 66. A second current source 104 is connected to the second terminals of the read element 66 and the shunting device 64. The first and second current sources 100 and 104 are biased by voltage supplies 108 and 110.

Figure 5:
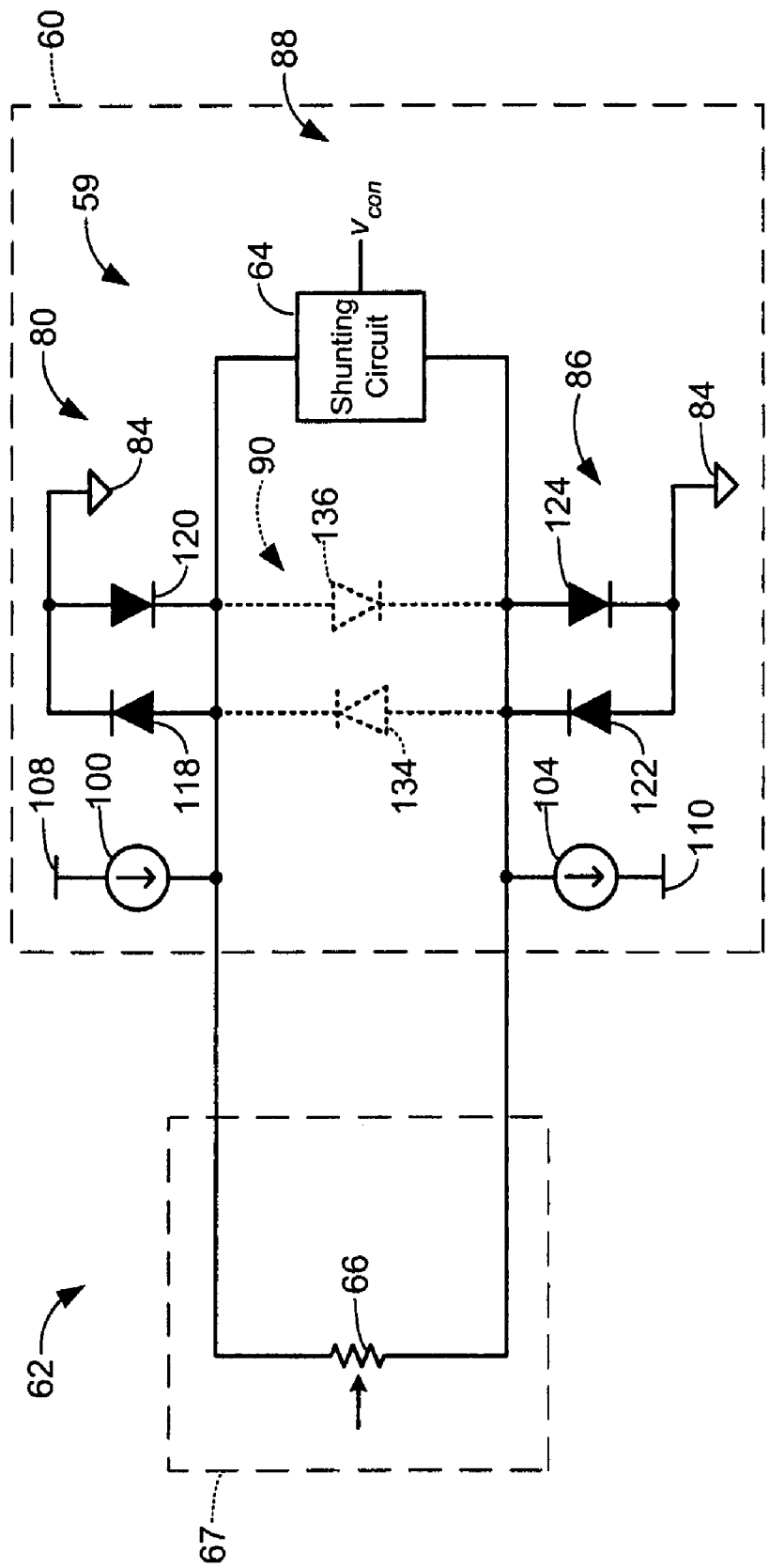
FIG. 5 is an electrical schematic of a second ESD protection circuit that includes a shunting device for a read element according to the present invention.

Referring now to FIG. 5, in one embodiment of the ESD protection circuit 59, the first voltage limiting circuit 80 may include first and second diodes 118 and 120, respectively. The second voltage limiting circuit 86 may include third and fourth diodes 122 and 124, respectively. As can be appreciated by skilled artisans, there are many other suitable voltage limiting circuits that can be used including, but not limited to, voltage limiting circuits including comparing circuits, transistors, voltage dividers, and/or other components.

An anode of the first diode 118 and a cathode of the second diode 120 communicate with the first terminal of the read element 66 and the first terminal of the shunting device 64. A cathode of the third diode 122 and an anode of the fourth diode 124 communicate with the second terminal of the read element 66 and the second terminal of the shunting device 124. A cathode of the first diode 118 and an anode of the second diode 120 communicate. An anode of the third diode 122 and a cathode of the fourth diode 124 communicate.

The first terminal of the read element 66, the anode of the first diode 118, the cathode of the second diode 120, and the first terminal of the shunting device 124 communicate with the first current source 100. The second terminal of the read element 66, the cathode of the third diode 122, the anode of the fourth diode 124, and a second terminal of the shunting device 64 communicate with a second current source 104. The cathode of the first diode 118, the anode of the second diode 120, the anode of the third diode 122, and the cathode of the fourth diode 124 communicate with the reference potential 84.

The optional third voltage limiting circuit 90 may include fifth and sixth diodes 134 and 136, respectively. A cathode of the fifth diode 134 and an anode of the sixth diode 136 communicate with the first terminal of the read element 66 and the first terminal of the shunting device 64. An anode of the fifth diode 134 and a cathode of the sixth diode 136 communicate with the second terminal of the read element 66 and the second terminal of the shunting device 64.

The current sources 100 and 104, respectively, bias the read element 66 during normal operation. The shunting device 64 is conductive while the read element 66 is disabled (or not reading) and is nonconductive while the read element 66 is enabled (or reading). Therefore, the shunting device 64 shorts the read element 66 when the read element 66 is disabled to protect the read element 66 from ESD damage.

A control voltage 138 that is applied to a control terminal of the shunting device 64 controls the shunting device 64 such that it is either conductive or nonconductive. For example, the control voltage 138 may be referenced from a power terminal of the preamp circuit 60. Alternatively, the control voltage 138 may be referenced from an exclusive power terminal for the read/write device 67 and/or the read element 66 alone. This allows the shunting device 64 to remain conductive while the preamp circuit 60 is powered and the read/write device 67 is unpowered. If the control voltage 138 is referenced from a power terminal of the read element 66 alone, this allows a write element in the read/write device 67 to remain operational while the read element 66 is disabled.

Figure 3:
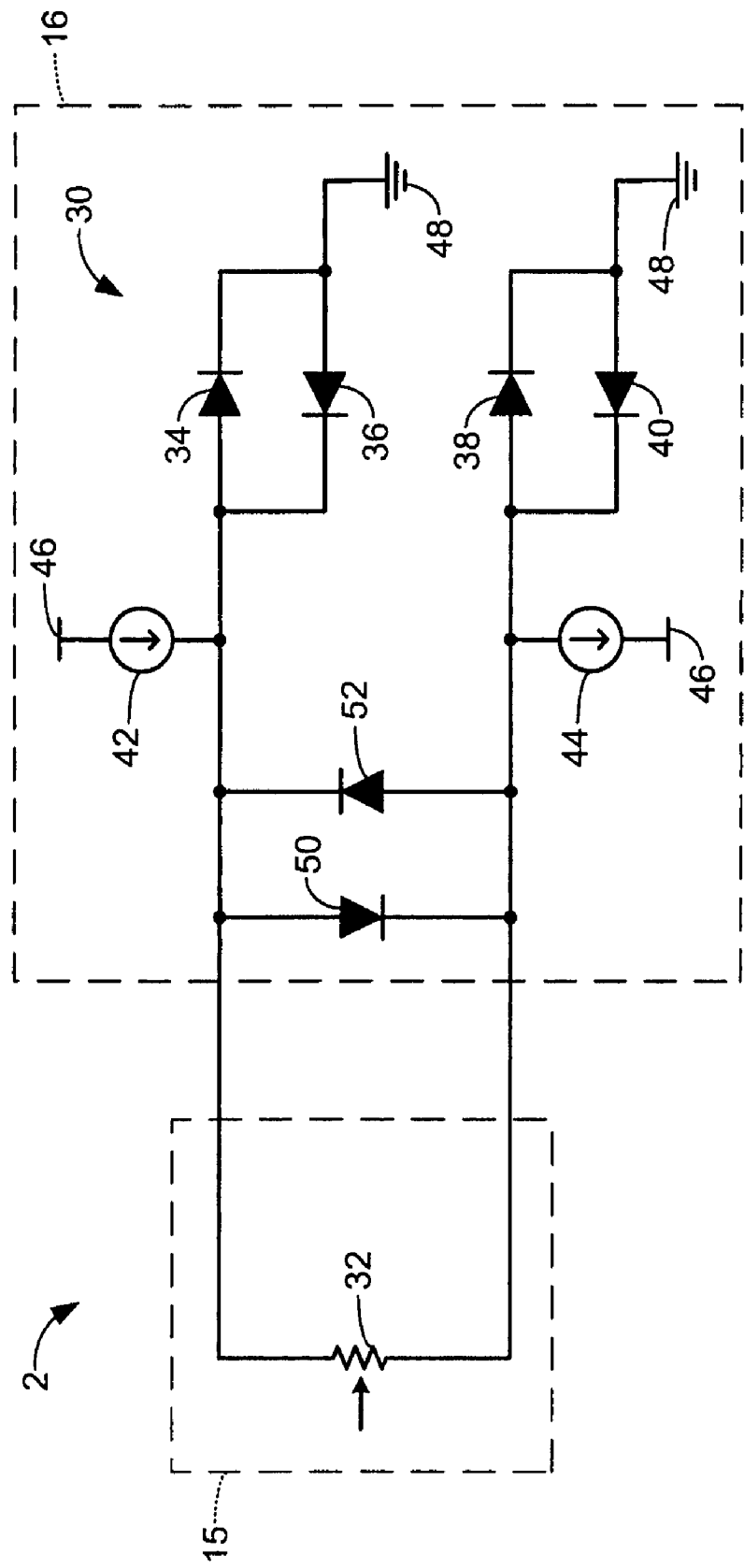
FIG. 3 is an electrical schematic of a preamp that includes an electrostatic discharge (ESD) protection circuit for a giant magneto-resistive (GMR) sensor according to the prior art.

As in the prior art ESD protection circuit 30 shown in FIG. 3, the diodes 118, 120, 122, 124, 134, and 136 form parallel back-to-back forward-biased diode shunting circuits. In FIG. 5, the diode shunting circuits limit a maximum voltage that is applied to the shunting device 64 as well as the read element 66. The maximum voltage is limited to the forward-biased turn-on voltage of the diodes 68, 70, 72, 74, 84, or 86, which is typically 0.7V for silicon junction diodes and 0.4-0.5V for Schottky diodes. Therefore, while the shunting device 64 protects the read element 66 from ESD damage when the read element is disabled, the diode shunting circuits protect both the shunting device 64 and the read element 66 from high voltage events when the read element is enabled.

It is desirable for the shunting device 64 to function as a short circuit when the read element 66 is disabled and an open circuit when the read element 66 is enabled. In this case, the shunting device 64 does not interfere with the read element 66 during normal operation. In order to protect against several volt ESD events, the shunting device 64 shorts opposite terminals of the read element 66.

Figure 6:
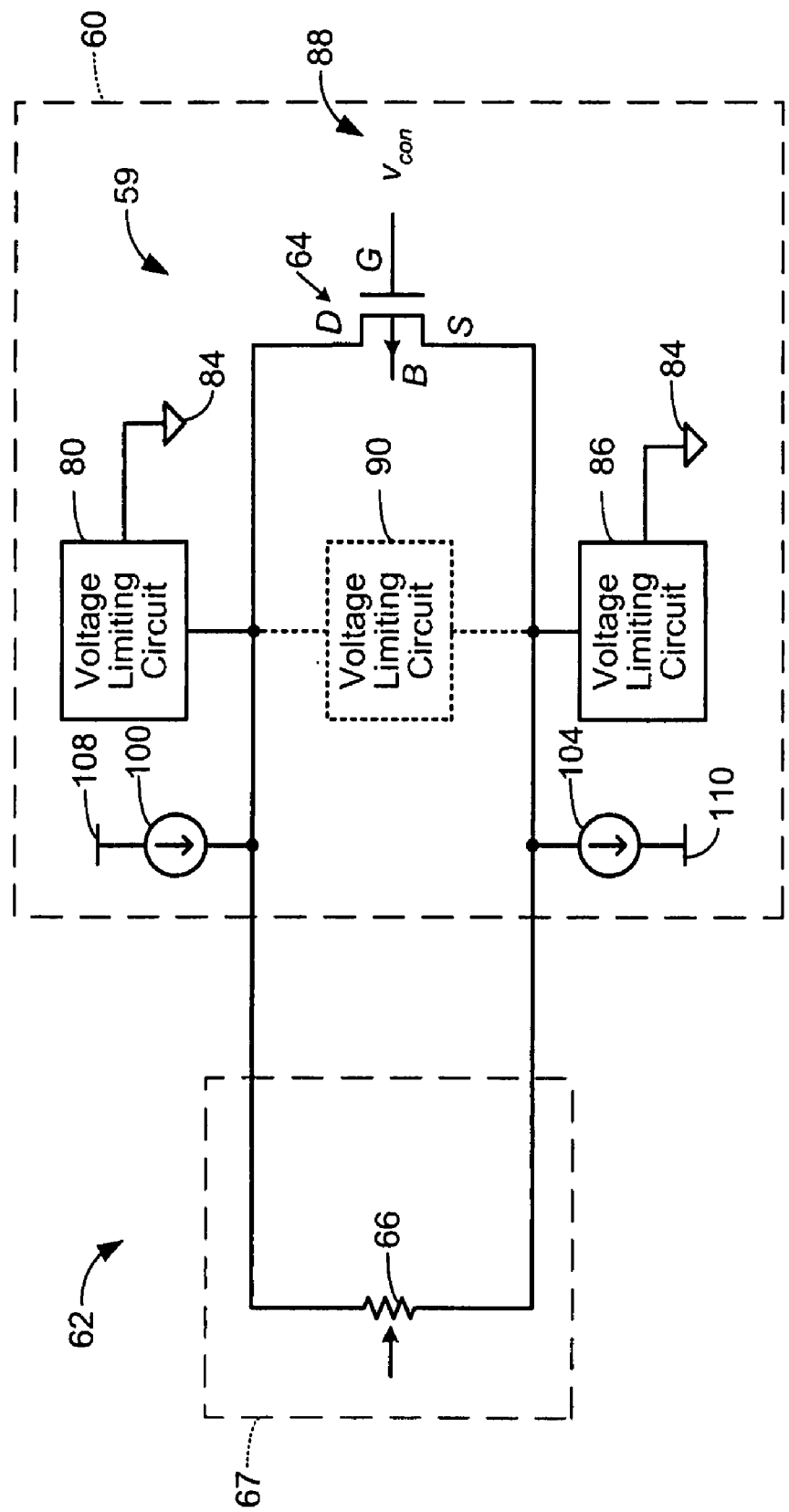
FIG. 6 is an electrical schematic of a third ESD protection circuit that includes a shunting transistor for a read element according to the present invention.

Referring now to FIG. 6, the shunting device 64 is preferably a normally-on transistor such as a depletion mode MOSFET. While a PMOS depletion mode transistor is shown, an NMOS depletion mode transistor, a JFET transistor and/or any other suitable transistor may be used. Commercially available transistors may not appropriately meet the requirements for the shunting device in a specific ESD protection circuit. However, the shunting device may be fabricated to suit the needs of any application. For example, a semiconductor device may be implanted or doped to operate as a depletion mode device. However, it is important to ensure that the shunting device 64 does not interfere with the read signal from the read element 66 during operation.

Although the risk of ESD damage to the read element 66 is greatest during manufacturing, the shunting device 64 according to the present invention can continue to protect the read element 66 after a hard disk drive is sealed and assembled. For example, the read/write device may only be powered when the read element or the write element in the read/write device are currently operating. Since the magnetic storage system typically includes multiple read/write devices, the shunting devices remain conductive to protect read elements in read/write devices that are not currently in use. The shunting devices that protect the read elements that are currently reading data at a given time are nonconductive.

The present invention is an improvement over conventional ESD protection circuits that rely solely on diode shunting circuits. Diode shunting circuits do not reliably protect read elements with voltage tolerances that are less than 0.4V. Even if diodes with forward-biased turn-on voltages less than 0.4V are developed, the diodes will usually display exponential characteristics that may interfere with normal operation of the read/write device. Whenever an appreciable amount of current flows through the diode, the diode has the potential to add noise to the magnetic storage system. The present invention solves this problem in part by utilizing the shunting device that does not conduct current when the read element is enabled. This allows for reliable protection of TGMR sensors and other read elements in magnetic storage systems.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A magnetic storage system, comprising:
a read element comprising:
  a first terminal; and
  a second terminal; and
an electrostatic discharge (ESD) protection circuit that includes a normally-on transistor that is directly coupled to said first terminal and said second terminal and that shorts said read element when said magnetic storage system is unpowered.

2. The magnetic storage system of claim 1 further comprising first and second current sources that communicate with said read element and said normally-on transistor.

3. The magnetic storage system of claim 1 wherein said normally-on transistor includes one of a depletion mode metal-oxide semiconductor field-effect transistor (MOSFET) and a JFET.

4. The magnetic storage system of claim 1 wherein said read element includes one of a magneto-resistive (MR) sensor, a giant magneto-resistive (GMR) sensor, and a tunneling giant magneto-resistive (TGMR) sensor.

5. The magnetic storage system of claim 1 wherein a voltage tolerance of said read element is less than 0.4 volts.

6. A magnetic storage system, comprising:
a read element; and
an electrostatic discharge (ESD) protection circuit that communicates with said read element and that includes a normally-on transistor that shorts said read element when said magnetic storage system is unpowered,
wherein said ESD protection circuit includes a first voltage limiting circuit that limits voltage that is input to first terminals of said normally-on transistor and said read element.

7. The magnetic storage system of claim 6 wherein during operation, said normally-on transistor receives a voltage control signal based on a read state of said read element and is conductive when said read element is disabled and nonconductive when said read element is enabled.

8. The magnetic storage system of claim 6 wherein said ESD protection circuit includes a second voltage limiting circuit that limits voltage that is input to second terminals of said normally-on transistor and said read element.

9. The magnetic storage system of claim 8 wherein said second voltage limiting circuit includes third and fourth diodes that communicate with said read element and said normally-on transistor.

10. The magnetic storage system of claim 6 wherein said first voltage limiting circuit includes first and second diodes that communicate with said read element and said normally-on transistor.

11. A magnetic storage system, comprising:
a read element;
an electrostatic discharge (ESD) protection circuit that communicates with said read element and that includes a normally-on transistor that shorts said read element when said magnetic storage system is unpowered; and
a third voltage limiting circuit that limits a voltage drop across said normally-on transistor and said read element.

12. The magnetic storage system of claim 11 wherein said third voltage limiting circuit includes fifth and sixth diodes that communicate with said read element and said normally-on transistor.

* * * * *